United States Patent [19]
Charon

[11] Patent Number: 5,441,632
[45] Date of Patent: Aug. 15, 1995

[54] SEPTIC SYSTEM WITH ABOVE-GROUND SEPTIC TANK

[75] Inventor: Richard J. Charon, Rochester, Mass.

[73] Assignee: Sep-Tainer Systems Corporation, Rochester, Mass.

[21] Appl. No.: 186,124

[22] Filed: Jan. 25, 1994

[51] Int. Cl.⁶ .................................... B01D 21/00
[52] U.S. Cl. .................... 210/170; 210/187; 210/262; 210/532.2
[58] Field of Search ........... 210/170, 187, 255, 257.1, 210/259, 262, 261, 256, 532.2, 85, 175; 220/565

[56] References Cited

U.S. PATENT DOCUMENTS

| | | | |
|---|---|---|---|
| 691,365 | 1/1902 | Dittler | 210/605 |
| 1,204,534 | 11/1916 | Andrews | 210/532.2 |
| 2,907,463 | 10/1959 | Light et al. | 210/202 |
| 3,260,371 | 7/1966 | Wall | 210/533 |
| 4,233,155 | 11/1980 | Hawkes et al. | 210/532.2 |
| 4,608,175 | 8/1986 | Nuttle | 210/532.2 |
| 4,865,631 | 9/1989 | Stroby et al. | 210/532.2 |
| 4,871,081 | 10/1989 | Ershiz | 220/565 |
| 4,933,076 | 6/1990 | Oshima et al. | 210/532.2 |
| 4,939,833 | 7/1990 | Thomas | 220/565 |
| 5,082,034 | 1/1992 | Sopr | 220/565 |
| 5,244,569 | 9/1993 | Di Amico | 210/170 |
| 5,273,180 | 12/1993 | Whatley, Jr. | 220/565 |

*Primary Examiner*—Christopher Upton
*Attorney, Agent, or Firm*—Salter & Michaelson

[57] ABSTRACT

A septic system has an above-ground septic tank which is installed in the house for which it is to be used, or within an enclosure attached to the house. The septic system further includes a secondary containment sump which surrounds the septic tank, and an in-ground leaching field. The septic tank has a removable cover, an inlet for receiving waste material, and an outlet for discharging liquid effluent to the leaching field which is built into the ground around the house. The secondary containment sump is operative for containing leakage or spillage of the septic tank contents in the event the septic tank leaks. In this connection, the septic system further comprises an alarm which signals the presence of fluid in the containment sump. The septic system still further includes an electric heater and thermostatic switch for preventing the septic tank from freezing. The instant septic system is particularly effective for use in waterfront areas where in-ground septic tanks are not permitted.

2 Claims, 2 Drawing Sheets

SEPTIC SYSTEM WITH ABOVE-GROUND SEPTIC TANK

BACKGROUND AND SUMMARY OF THE INVENTION

The instant invention relates to sewage disposal and more particularly to a septic system having an above-ground septic tank which is installed within the house for which it is to be used, or within an enclosure attached to the house.

Above-ground sewage disposal and treatment systems have heretofore been known in the art. In this connection the Light et al U.S. Pat. Nos. 2,907,463; Wall 3,260,371; Nuttle 4,608,175; Stroby et al 4,865,631; and Oshima et al 4,933,076 represent the closest prior art to the subject invention of which the applicant is aware. The patent to Light et al discloses a septic and antiseptic sewage disposal unit which is operative for use in ocean vessels. The disposal unit includes an anaerobic digestion chamber which is augmented by a series of settling chambers for clarifying the liquid effluent. The effluent is then treated with chlorine and discharged into open water. The patent to Wall discloses an organic waste disposal system comprising an above-ground container having a waste inlet and an outlet for liquid effluent. The container further includes a gas outlet for the recovery of gasses produced by decomposition of solid waste matter. The patent to Nuttle discloses a waste disposal system having a dry flushing toilet, an aerobic composting chamber positioned in the basement of a house, and a solar distillation apparatus for evaporation of waste water. The patent to Stroby concerns a vacuum sewage system having a waste tank which is positioned in the basement of a house. The patent to Oshima discloses a sewage treatment system having in-ground settling, separating and washing tanks and above-ground filtering apparatus.

The instant invention provides a septic system having an above-ground septic tank which is installed in the house for which it is to be used, or within an enclosure attached to the house. Briefly, the instant septic system comprises a septic tank, a secondary containment sump which surrounds the septic tank, and a leaching field which is built into the ground around the house. The septic tank has a removable cover, an inlet for receiving waste material, and an outlet for discharging liquid effluent to the leaching field. A first embodiment of the septic system includes a collection basin for collecting sewage from the plumbing waste pipes and an ejector pump for pumping the collected sewage to the inlet of the septic tank. In a second embodiment, sewage flows directly into the septic tank by gravity. The secondary containment sump is operative for containing leakage or spillage of the septic tank contents in the event that the septic tank leaks. In this connection, the septic system further comprises a sump alarm which signals the presence of fluid in the containment sump. The septic system still further includes an electric heater and a thermostatic switch for controlling the heater so as to prevent the septic tank from freezing. It has been found that the instant septic system is particularly effective for use in seasonal homes in waterfront beach areas where in-ground septic tanks are not permitted.

Accordingly, it is an object of the instant invention to provide a septic system having an above-ground septic tank.

It is another object of the instant invention to provide a septic system which is effective for use in waterfront beach areas where in-ground septic tanks are not permitted.

It is still another object to provide an above-ground septic tank which is installed in the house for which it is to be used, or within an enclosure attached to the house.

It is yet another object to provide a containment sump for an above-ground septic tank.

It is still a further object to provide an alarm system which indicates spillage or leakage of the septic tank contents.

It is yet another object to provide a heating system for an above-ground septic tank to prevent freezing of the septic tank.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
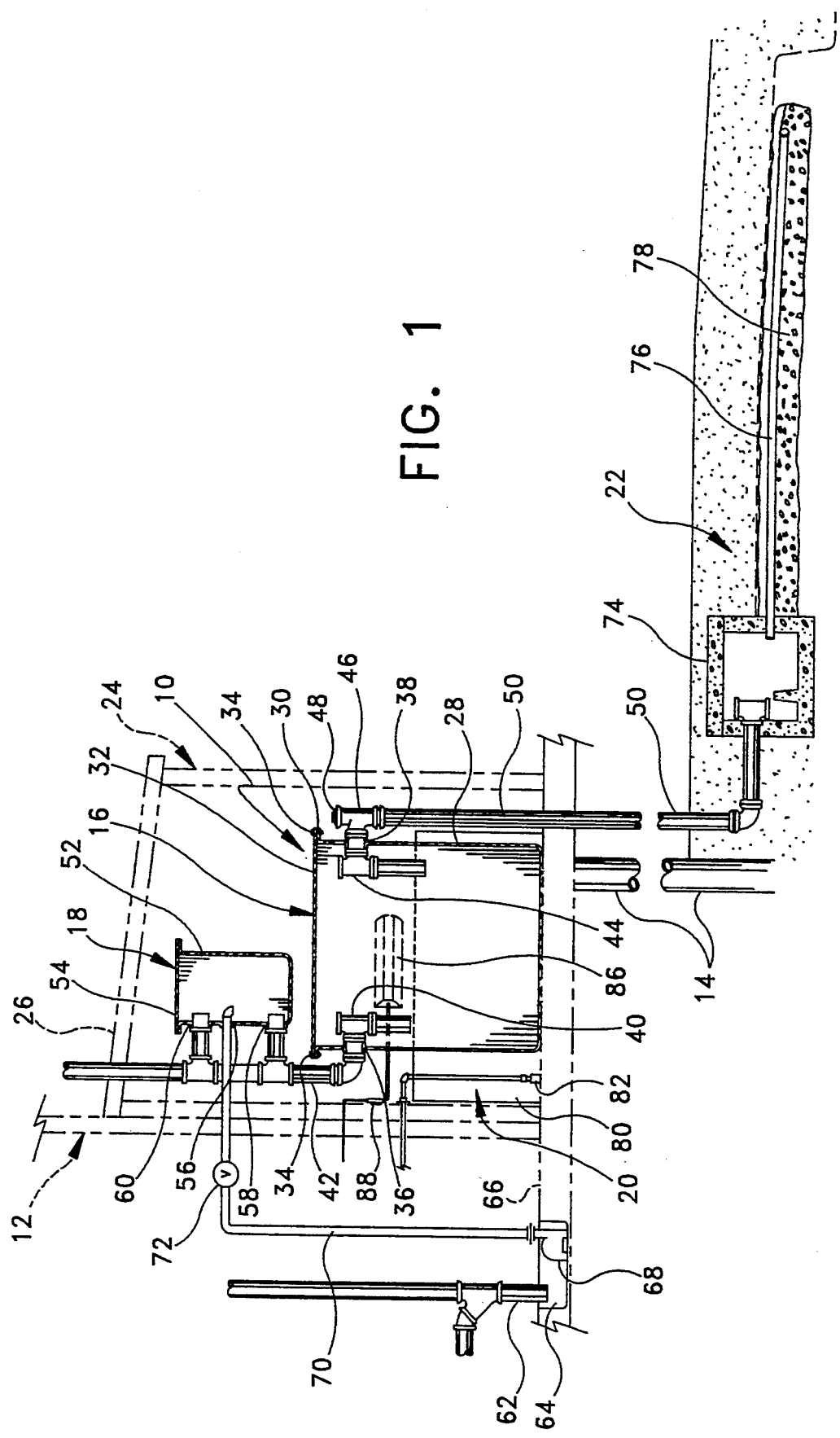
FIG. 1 is an elevational view of the instant septic system showing the septic tank, containment sump, surge tank, collection basin and leaching field distribution box.
Figure 2:
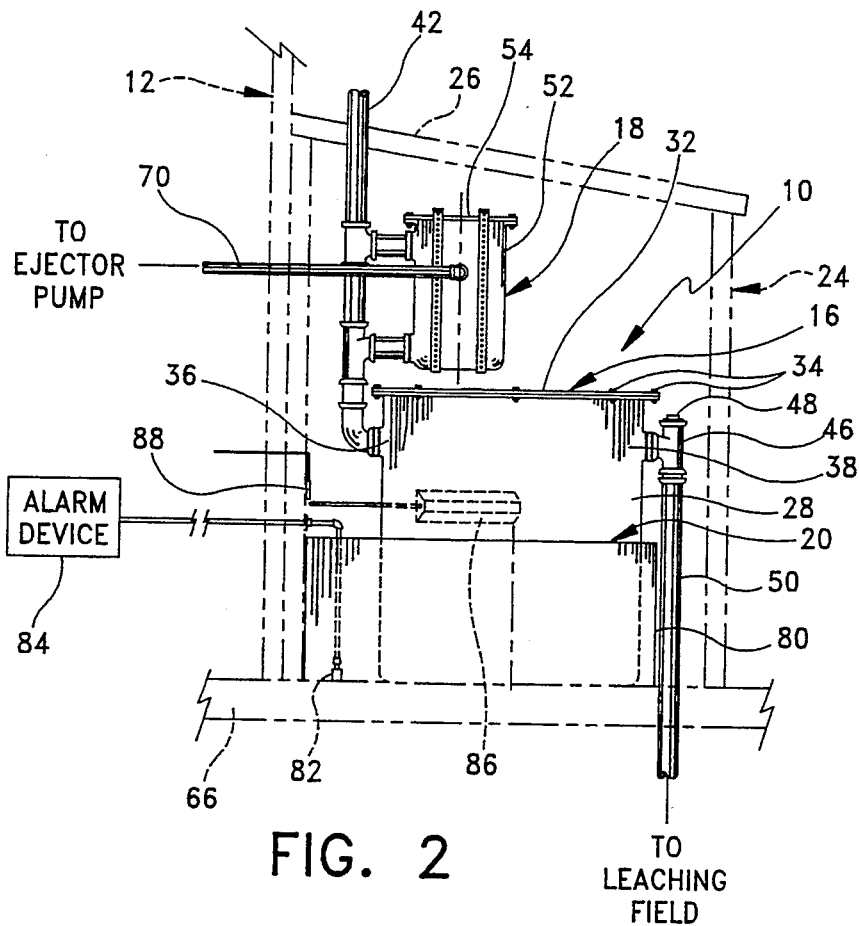
FIG. 2 is an elevational view of the septic tank and surge tank.

Referring now to the drawings, a first embodiment of the septic system of the instant invention is illustrated and generally indicated at 10 in FIG. 1. As will hereinafter be more fully described, the instant septic system 10 is particularly effective for use in seasonal homes and houses in waterfront areas where in-ground septic tanks are not permitted. The house 12 preferably comprises a seasonal beach house which is supported on piles or stilts 14. The septic system 10 comprises an above-ground septic tank generally indicated at 16, a surge tank generally indicated at 18, a secondary containment sump 20 which surrounds the septic tank 16, and an in-ground leaching field generally indicated at 22.

The septic tank 12 is preferably installed within an insulated enclosure generally indicated at 24 which is attached to the side of the house 12. The insulated enclosure 24 preferably includes a hinged top 26, or side door, which allows access to the septic tank 16 so that it can be emptied. Since the septic tank 16 is situated above-ground, and therefore may be exposed to cold temperatures during the winter, it is important that the enclosure 24 be well insulated. Alternatively, the septic tank 16 can be installed directly within the house 12 itself, although access to the septic tank 16 from within the house 12 is not recommended.

The septic tank 16 is preferably constructed from a high density polyethylene plastic, and it preferably comprises an open-ended cylindrical container 28 having a volume of approximately 500 gallons. The container 28 includes an upper sealing flange 30. The septic tank 16 further comprises a removable cover 32 which is sealed to the sealing flange 30 by a neoprene gasket (not shown) and stainless steel bolts 34. The container 28 still further includes a molded inlet 36 for receiving waste material, and a molded outlet 38 for discharging liquid effluent to the leaching field 22. The inlet 36 of the container 28 is fitted with an interior T-pipe 40 and an exterior venting pipe 42 which is preferably vented through the top 26 of the enclosure 24. The outlet 38 of the septic tank 16 is fitted with an interior T pipe 44 and an exterior T pipe 46. The upper end of the exterior T pipe 46 is fitted with a threaded end cap 48, and the lower end is connected to an outlet pipe 50 which empties into the leaching field 22. The threaded end cap 48 can be removed to clean the outlet pipe 50 in the event a blockage occurs. It is pointed out that the outlet pipe 50 extends downwardly through a hole in the floor of the enclosure 24 and that the hole 15 sealed with an appropriate sealing material.

The surge tank 18 is also preferably constructed from a high density polyethylene plastic, and it preferably comprises a cylindrical container 52 having a volume of approximately 30 gallons. The surge tank 18 further includes a removable cover 54 which is sealed to the container 52 by any suitable fasteners. The container 52 still further includes an inlet 56 for receiving waste material and two outlets 58 and 60 which are connected to the venting pipe 42 at positions above the inlet 36 of the septic tank 16.

As illustrated in FIG. 1, it can be seen that the septic tank 16, and more particularly, the inlet 56 of the surge tank 18, is positioned above the level of the plumbing waste pipes 62 of the house 12. In this connection, the septic system 10 still further includes a collection basin 64 which is installed in the floor 66 of the house 12 for collecting sewage from the plumbing waste pipes 62 and an ejector pump 68 for periodically pumping sewage from the collection basin 64 to the surge tank 18. A feed pipe 70 extends from the ejector pump 68 to inlet 56 of the surge tank 18. The feed pipe 70 preferably includes a check valve 72 for selectively regulating flow. The collection basin 64 preferably has a volume of approximately 20 gallons. The ejector pump 68 is well known in the art, and therefore no further description of its operation is thought to be necessary.

In operation of the septic system 10, sewage is first received into the collection basin 64 from the plumbing waste pipes 62. The ejector pump 68 then periodically pumps the sewage into the surge tank 18 where it flows downwardly into the septic tank 16 by means of gravity. It is pointed out that the surge tank 18 functions as a buffer zone where sewage can accumulate temporarily in the event that the sewage does not quickly empty out of the septic tank 16. While the surge tank 18 is a preferred feature of the invention, it is not considered essential to its function. The above-ground septic tank 16 functions essentially the same as a conventional in-ground septic tank. In this regard, sewage is received into the septic tank 16 wherein the solid matter settles to the bottom. The solid matter is then reduced by means of anaerobic decomposition as in a conventional septic tank. When the septic tank 16 becomes filled with solid matter, it can be emptied by removing the cover 32 and having the contents pumped out. Liquid effluent flows out of the septic tank 16 by means of gravity when the liquid level rises above the level of the outlet 38. The liquid effluent thereafter flows downwardly through the outlet pipe 50 to the in-ground leaching field 22.

The leaching field 22 is conventional in the art, and it comprises a concrete distribution box 74, and a plurality of apertured distribution pipes 76 which extend outwardly and downwardly into a gravel and stone leaching field 78. The outlet pipe 50 extends downwardly from the septic tank 16 into the ground where it is connected to the distribution box 74. Liquid effluent received into the distribution box 74 flows outwardly through the distribution pipes 76 where it is finally discharged into the ground.

The containment sump 20 is preferably constructed from (HDPE)—high density polyethylene, and it comprises an open-ended cylindrical tub 80 having a volume of approximately five hundred fifty (550) gallons. The septic tank 16 is positioned inside the containment sump 20, wherein the containment sump 20 is operative for containing any leakage or spillage of the septic tank contents in the event that the septic tank 16 leaks. The volume of the containment sump 20 is larger than the septic tank 16 so that the entire contents of the septic tank 16 could empty into the containment sump 20 without any leakage outside of the system. In this connection, the septic system 10 further comprises a sump alarm which signals the presence of fluid in the containment sump 20. The alarm preferably comprises a sump switch 82 positioned inside the containment sump 20 adjacent the bottom wall thereof, and a visible or audible alarm device 84, such as a speaker for outputting an audible alarm, or a light for indicating that the sump switch 82 has been closed. Since, the septic tank 16 is preferably installed in an enclosure 24 which is outside the house 12, the septic system 10 preferably further includes an electric heater 86 and a thermostatic switch 88 for controlling the heater 86 in order to prevent the septic tank 16 from freezing. While the specific electrical connections of the alarm and heating devices have not been illustrated, it is to be understood that these connections are conventional and can be readily accomplished by anyone skilled in the art.

Figure 3:
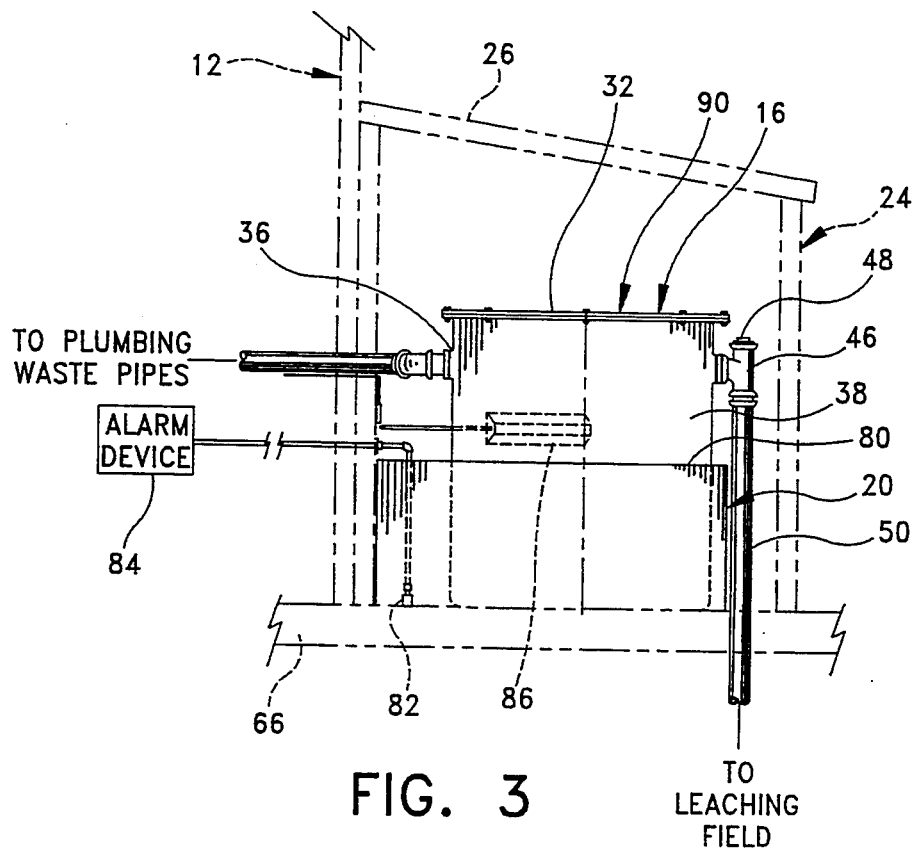
FIG. 3 is an elevational view of a second embodiment of the instant septic system.

A second embodiment of the instant septic system is illustrated and generally indicated at 90 in FIG. 3. In the septic system 90, the septic tank 16 is installed so that the inlet 36 is positioned below the level of the plumbing waste pipes (not shown) wherein sewage flows directly into the septic tank 16 by means of gravity. In this connection the insulated enclosure 24 can be attached to the side of the house 12, or underneath the house 12, whichever is desirable for the necessary gravity flow. The septic tank 16, containment sump 20, sump switch 82, electric heater 86, thermostatic switch 88 and leaching field 22 of the second embodiment are the same as previously described in the first embodiment. However, the use of gravity for sewage flow in the second embodiment eliminates the need for the collection basin 64, and the ejector pump 68. The use of gravity flow also precludes the use of the surge tank 18 since its position above the septic tank 16 would effectively raise the level of the septic tank inlet and negate the gravity flow effect.

It can therefore be seen that the instant invention provides a septic system which is particularly useful in waterfront areas where in-ground septic tanks are not permitted. The instant septic system includes a completely self-contained above-ground septic tank which is easily installed within an enclosure attached to the side of a house for which the septic tank is to be used. The septic system further includes a secondary containment sump which is operative for containing leaks or spillage of the contents of the septic tank in the event that the septic tank leaks. The enclosure for the septic tank preferably includes a hinged top or door, and the cover of the septic tank is easily removable for emptying the contents of the septic tank when the septic tank becomes filled. Still further, the containment sump includes a sump alarm to signal the presence of liquid in the secondary containment sump. Even further, the septic system includes a heating system for preventing the septic tank from freezing in cold weather. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A septic system comprising:
   a self-contained, above-ground septic tank which is positionable within an enclosed area of a building structure, said septic tank comprising an open-ended container having a sealed, removable cover, an inlet for receiving sewage, and an outlet for discharging liquid effluent from said septic tank, said outlet pipe being connected to an in-ground leaching field;
   a containment sump surrounding said septic tank for containing leakage of the contents of said septic tank, said containment sump having a larger volume than said septic tank;
   a device mounted adjacent a bottom of said containment sump for detecting the presence of fluid in said containment sump;
   an alarm device coupled to said detecting device for signaling the presence of fluid in said containment sump;
   a temperature measuring device external of said tank for monitoring an air temperature in the vicinity of said septic tank;
   a heating device, external of said tank, coupled to said temperature measuring device for heating said enclosed area of said building structure when said temperature falls below a predetermined temperature;
   a collection basin for receiving sewage from a plumbing waste pipe, said collection basin being arranged at a different location within said building structure and at an elevation which is below an elevation of said septic tank;
   a surge tank positioned above said septic tank, said surge tank having an outlet connected to said inlet of said septic tank; and
   an ejector pump for pumping said sewage from said collection basin to an inlet of said surge tank, said sewage flowing from said surge tank into said septic tank by means of gravity.

2. A septic system comprising:
   a self-contained, above-ground septic tank which is positionable within an enclosed area of a building structure, said septic tank comprising an open-ended container having a sealed, removable cover, an inlet for receiving sewage, and an outlet for discharging liquid effluent from said septic tank, said outlet pipe being connected to an in-ground leaching field;
   a containment sump surrounding said septic tank for containing leakage of the contents of said septic tank, said containment sump having a larger volume than said septic tank;
   a collection basin for receiving sewage from a plumbing waste pipe, said collection basin being arranged at a different location within said building structure and at an elevation which is below an elevation of said septic tank;
   a surge tank positioned above said septic tank, said surge tank having an outlet connected to said inlet of said septic tank; and
   an ejector pump for pumping said sewage from said collection basin to an inlet of said surge tank, said sewage flowing from said surge tank into said septic tank by means of gravity.

* * * * *